(12) United States Patent
Yamamoto et al.

(10) Patent No.: US 11,613,435 B2
(45) Date of Patent: Mar. 28, 2023

(54) ARTICLE SUPPLYING APPARATUS AND COMBINATORIAL WEIGHING DEVICE

(71) Applicant: ISHIDA CO., LTD., Kyoto (JP)

(72) Inventors: Shingo Yamamoto, Ritto (JP); Seisaku Iwasa, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 407 days.

(21) Appl. No.: 16/761,232

(22) PCT Filed: Sep. 5, 2018

(86) PCT No.: PCT/JP2018/032906
§ 371 (c)(1),
(2) Date: May 1, 2020

(87) PCT Pub. No.: WO2019/092964
PCT Pub. Date: May 16, 2019

(65) Prior Publication Data
US 2020/0354168 A1 Nov. 12, 2020

(30) Foreign Application Priority Data
Nov. 7, 2017 (JP) .............................. JP2017-214769

(51) Int. Cl.
*B65G 65/00* (2006.01)
*B65G 61/00* (2006.01)
*B25J 9/00* (2006.01)
*B25J 15/00* (2006.01)

(52) U.S. Cl.
CPC ........... *B65G 65/005* (2013.01); *B65G 61/00* (2013.01); *B25J 9/0018* (2013.01); *B25J 9/0093* (2013.01);
(Continued)

(58) Field of Classification Search
None
See application file for complete search history.

(56) References Cited

U.S. PATENT DOCUMENTS

| 5,699,655 A | 12/1997 | Kuboyama et al. |
| 6,112,881 A | 9/2000 | Osti et al. |

(Continued)

FOREIGN PATENT DOCUMENTS

| CN | 1171357 A | 1/1998 |
| CN | 101310167 A | 11/2008 |

(Continued)

OTHER PUBLICATIONS

The International Preliminary Report on Patentability report dated May 22, 2020.

*Primary Examiner* — William R Harp
(74) *Attorney, Agent, or Firm* — Global IP Counselors, LLP

(57) ABSTRACT

An article supplying apparatus includes a retention unit configured to retain an article, a robot hand configured to insert the article retained in the retention unit into a container, and a control unit configured to control operation of the robot hand. The robot hand has a holding portion for holding the article. The control unit executes holding control in which the article is held by the holding portion; and stand-by insertion control in which after the holding portion is temporarily disposed at a stand-by position different from a position immediately above an article insertion port in the container and set on a movement path from a start position of the holding through the holding control to the position immediately thereabove, the holding portion is moved to the position immediately thereabove, and the article is inserted into the container via the article insertion port.

12 Claims, 6 Drawing Sheets

(52) U.S. Cl.
CPC ... *B25J 15/0028* (2013.01); *B65G 2201/0202* (2013.01); *B65G 2814/0344* (2013.01)

(56) References Cited

U.S. PATENT DOCUMENTS

| | | | |
|---|---|---|---|
| 6,437,256 B1 * | 8/2002 | Miyamoto | G01G 19/393 |
| | | | 177/25.18 |
| 7,952,036 B2 * | 5/2011 | Kieselhorst | G01G 19/393 |
| | | | 177/25.18 |
| 2009/0145670 A1 | 6/2009 | Grundtvig et al. | |
| 2014/0163737 A1 | 6/2014 | Nagata et al. | |
| 2016/0290852 A1 | 10/2016 | Chandler et al. | |

FOREIGN PATENT DOCUMENTS

| | | | |
|---|---|---|---|
| CN | 101919578 A | 12/2010 | |
| CN | 202606414 U | 12/2012 | |
| CN | 105083926 A | 11/2015 | |
| CN | 205361555 U | 7/2016 | |
| CN | 206423466 U | 8/2017 | |
| CN | 206479241 U | 9/2017 | |
| JP | H08-154841 A | 6/1996 | |
| JP | 2000-058625 A | 2/2000 | |
| JP | 2002-052487 A | 2/2002 | |
| JP | 2011-079159 A | 4/2011 | |
| JP | 2012052487 A | 3/2012 | |
| JP | 2015-219190 A | 12/2015 | |
| JP | 2016-132530 A | 7/2016 | |
| JP | 2017-095282 A | 6/2017 | |
| KR | 20160143898 A | 12/2016 | |
| WO | 2013027251 A1 | 2/2013 | |

\* cited by examiner

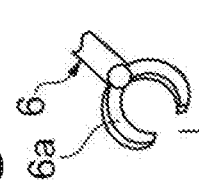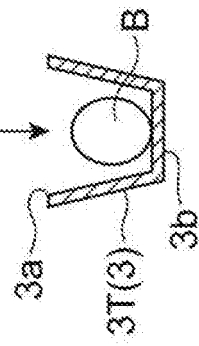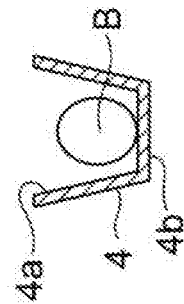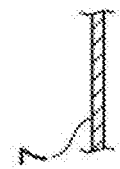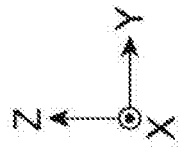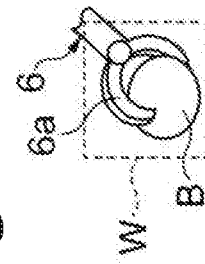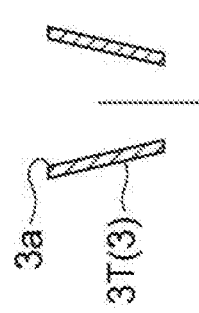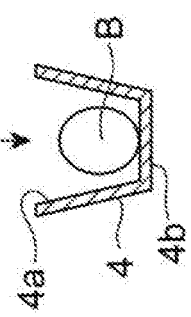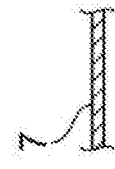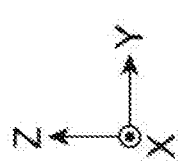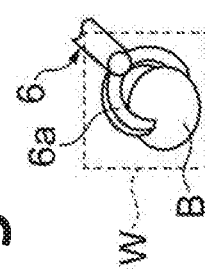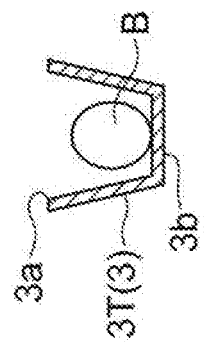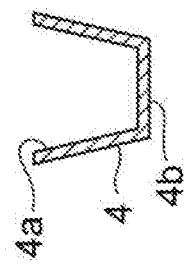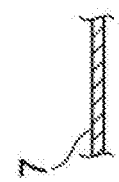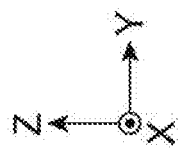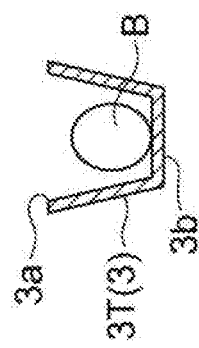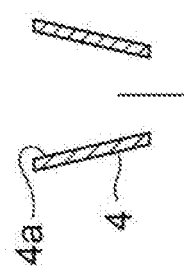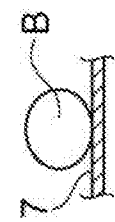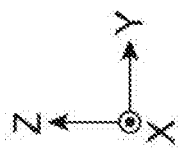

ARTICLE SUPPLYING APPARATUS AND COMBINATORIAL WEIGHING DEVICE

CROSS-REFERENCE TO RELATED APPLICATIONS

This U.S. National stage application claims priority under 35 U.S.C. § 119(a) to Japanese Patent Application No. 2017-214769, filed in Japan on Nov. 7, 2017, the entire contents of which are hereby incorporated herein by reference.

TECHNICAL FIELD

The present disclosure relates to an article supplying apparatus and a combinatorial weighing device.

BACKGROUND ART

For example, Japanese Unexamined Patent Publication No. 2015-219190 discloses a combinatorial weighing device in which articles weighed by weighing means are retained in a plurality of stock portions (containers) and combinatorial weighing targeting a plurality of articles retained in the plurality of stock portions is performed. In this combinatorial weighing device, a robot hand is utilized when an article is inserted into the stock portions.

SUMMARY OF INVENTION

Technical Problem

In the foregoing technology in the related art, it is preferable that an article be able to be instantly inserted into a container after the article is held by a holding portion of a robot hand. However, when another article is already retained in the container into which an article is to be inserted, there is a need to stand by until the container becomes empty while the article is held by the holding portion. In this case, for example, in order to reduce a time lag caused by operation of the robot hand and to realize efficient article insertion, it is conceivable that the holding portion holding an article stand by at a position immediately above an article insertion port of the container. However, during this stand-by, even though articles are held by the holding portion, there is a possibility that at least some of the articles may slip out of the holding portion and may be erroneously inserted into the container.

An aspect of the present invention aims to maintain efficient article insertion and to appropriately perform the article insertion in an article supplying apparatus and a combinatorial weighing device utilizing a robot hand.

Solution to Problem

According to an aspect of the present invention, there is provided an article supplying apparatus including a retention unit configured to retain an article serving as an insertion target, a robot hand configured to insert the article retained in the retention unit into a container, and a control unit configured to control operation of the robot hand. The robot hand has a holding portion for holding the article. The control unit executes holding control in which the article retained in the retention unit is held by the holding portion; and stand-by insertion control in which after the holding portion is temporarily disposed at a stand-by position different from a position immediately above an article insertion port in the container and set on a movement path from a start position of the holding through the holding control to the position immediately thereabove in a state in which the article is held by the holding portion, the holding portion is moved to the position immediately thereabove, and the article is inserted into the container via the article insertion port.

In this article supplying apparatus, an article is held by the holding portion of the robot hand, and the holding portion is temporarily disposed at the stand-by position in this state. Thereafter, the holding portion is moved to the position immediately above the article insertion port (which will hereinafter be simply referred to as "a position immediately thereabove") in the container, and the article is inserted into the container via the article insertion port. Since the stand-by position is different from the position immediately thereabove, even if some articles slip out of the holding portion, erroneous insertion of some of the articles which have slipped out into the container can be curbed. Moreover, this stand-by position is set on the movement path from the start position of the holding through holding control to the position immediately thereabove. Thus, for example, compared to when the holding portion stands by at a position away from the movement path, the time lag described above can be curbed, and efficient article insertion can be maintained. Therefore, in the article supplying apparatus utilizing the robot hand, efficient article insertion can be maintained and the article insertion can be appropriately performed.

In an embodiment, the control unit may cause the holding portion to hold the article through the holding control and then determine whether or not the article is able to be inserted into the container, may execute the stand-by insertion control when it is determined that the article is not able to be inserted into the container, and may execute direct insertion control in which the holding portion is instantly moved to the position immediately thereabove without being temporarily disposed at the stand-by position and the article is inserted into the container via the article insertion port when it is determined that the article is able to be inserted into the container. In this configuration, when an article is inserted into the container by the robot hand, the holding portion is not temporarily disposed at the stand-by position at all times, but an article is inserted into the container as it stands without causing the holding portion to be temporarily disposed at the stand-by position when an article can be inserted into the container. Thus, unnecessary stand-by of the holding portion can be curbed, and efficient article insertion can be realized.

In the embodiment, the stand-by position may be set at a position closer to the article insertion port than the start position of the holding through the holding control. In this configuration, for example, compared to when the holding portion stands by at the start position of the holding or a position farther away from the article insertion port than the start position of the holding, the time lag described above can be curbed, and efficient article insertion can be maintained.

In the embodiment, the stand-by position may be set in a region adjacent to the article insertion port when viewed from above. In this configuration, the time lag described above can be further curbed, and efficient article insertion can be realized.

In the embodiment, a collection portion receiving the article which has fallen from the holding portion may be disposed below the stand-by position. In this configuration, an article which has slipped out of the holding portion during stand-by at the stand-by position can be collected.

In the embodiment, the stand-by position may be set at a height position higher than the article insertion port and between the retention unit and the article insertion port when viewed from above. In this configuration, the time lag described above can be further curbed, and efficient article insertion can be realized.

According to another aspect of the present invention, there is provided a combinatorial weighing device including a retention unit configured to retain an article serving as an insertion target; a plurality of hoppers configured to allow the article to be inserted thereinto and to temporarily retain the article; a weighing unit configured to weigh each of a plurality of the articles retained in the plurality of hoppers; a robot hand configured to insert the article retained in the retention unit into the hopper; and a control unit configured to control operation of the robot hand, to select a plurality of the articles, of which a sum of weighing values becomes a target mass value set in advance, from the plurality of the articles weighed by the weighing unit, and to discharge the plurality of the selected articles from the hoppers. The robot hand has a holding portion for holding the article. The control unit executes holding control in which the article retained in the retention unit is held by the holding portion; and stand-by insertion control in which after the holding portion is temporarily disposed at a stand-by position different from a position immediately above an article insertion port in the hopper and set at a position closer to the article insertion port than a start position of holding through the holding control in a state in which the article is held by the holding portion through the holding control, the article is inserted into the hopper via the article insertion port.

In this combinatorial weighing device, an article is held by the holding portion of the robot hand, and the holding portion is temporarily disposed at the stand-by position in this state. Thereafter, the holding portion is moved to the position immediately above the hopper, and the article is inserted into the hopper via the article insertion port. Since the stand-by position is different from the position immediately thereabove, even if some articles slip out of the holding portion, erroneous insertion of some of the articles which have slipped out into the hopper can be curbed. Moreover, this stand-by position is a position closer to the article insertion port than the start position of the holding through holding control. Thus, for example, compared to when the holding portion stands by at the start position of the holding or a position farther away from the position immediately thereabove than the start position of the holding, the time lag described above can be curbed, and efficient article insertion can be maintained. Therefore, in the combinatorial weighing device utilizing the robot hand, efficient article insertion can be maintained and the article insertion can be appropriately performed.

Advantageous Effects of Invention

According to the aspect of the present invention, it is possible to maintain efficient article insertion and to appropriately perform the article insertion in the article supplying apparatus and the combinatorial weighing device utilizing a robot hand.

BRIEF DESCRIPTION OF DRAWINGS

FIG. 5(a) is a view for describing stand-by insertion control of the combinatorial weighing device in FIG. 1. FIG. 5(b) is a view illustrating a continuation of FIG. 5(a). FIG. 5(c) is a view illustrating a continuation of FIG. 5(b). FIG. 5(d) is a view illustrating a continuation of FIG. 5(c).

DESCRIPTION OF EMBODIMENT

Hereinafter, an embodiment will be described in detail with reference to the drawings. In the following description, the same reference signs are applied to elements which are the same or corresponding, and duplicate description thereof will be omitted.

Figure 1:
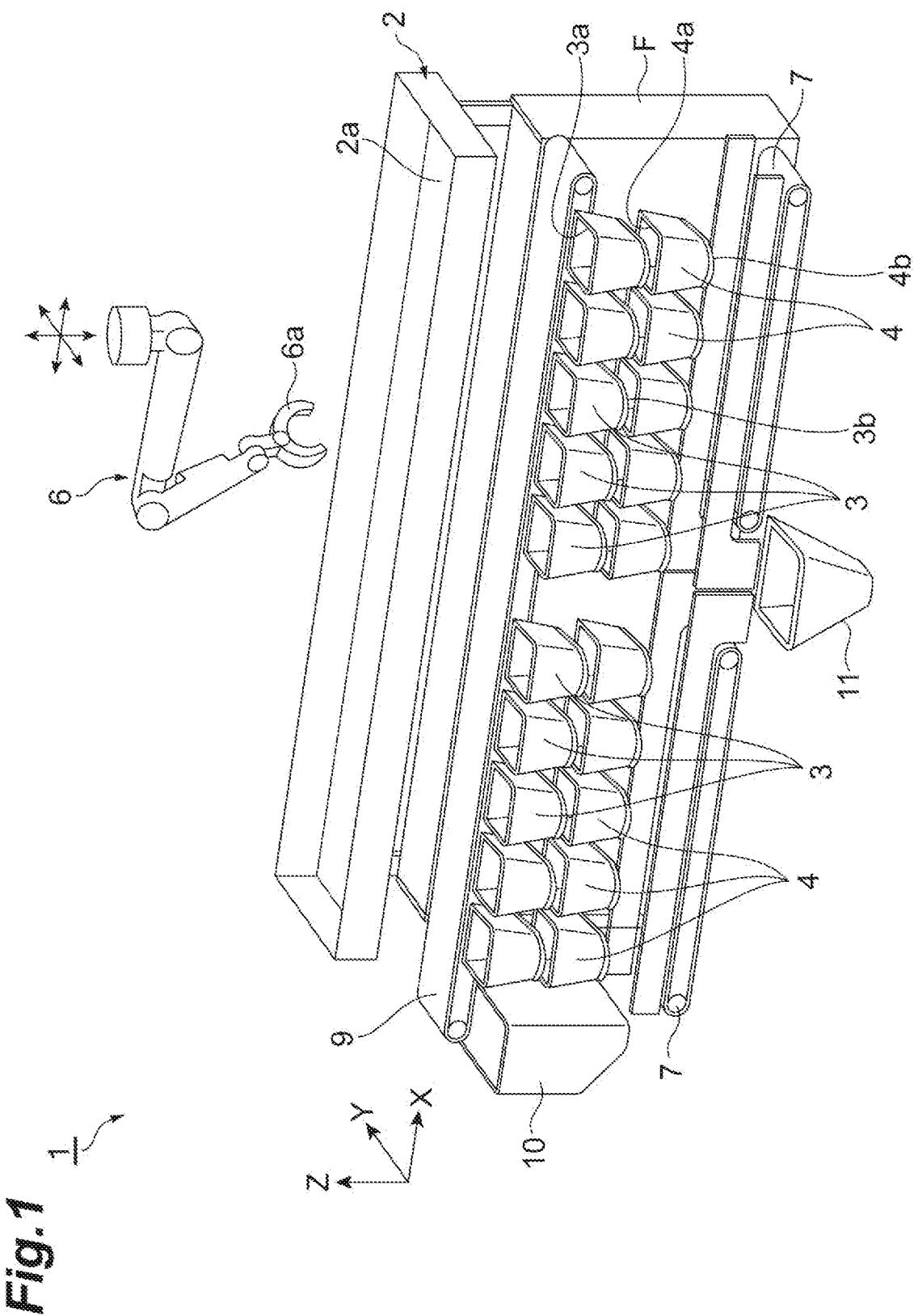
FIG. 1 is a perspective view illustrating a combinatorial weighing device according to an embodiment.
Figure 2:
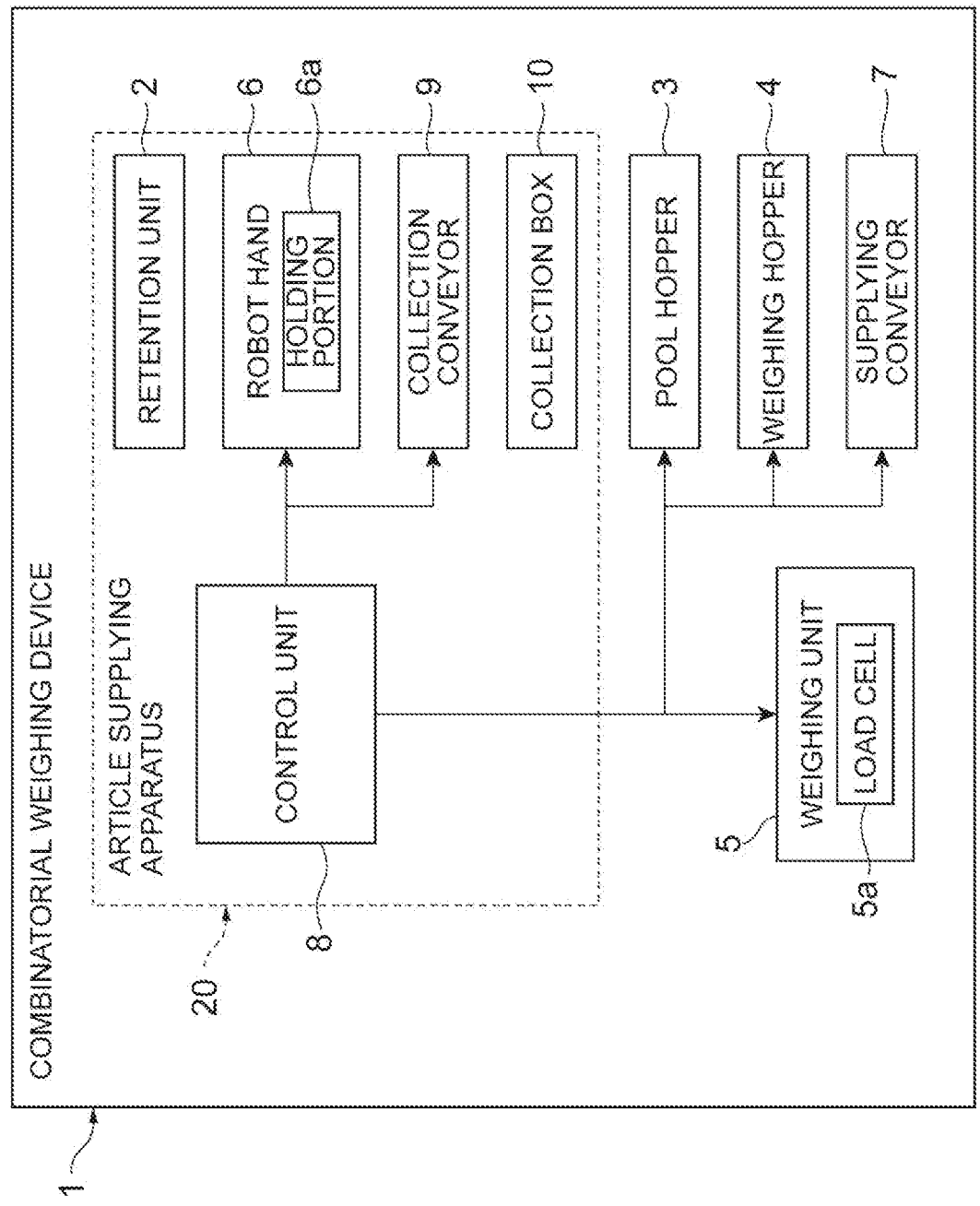
FIG. 2 is a block diagram showing a configuration of the combinatorial weighing device in FIG. 1.
Figure 3:
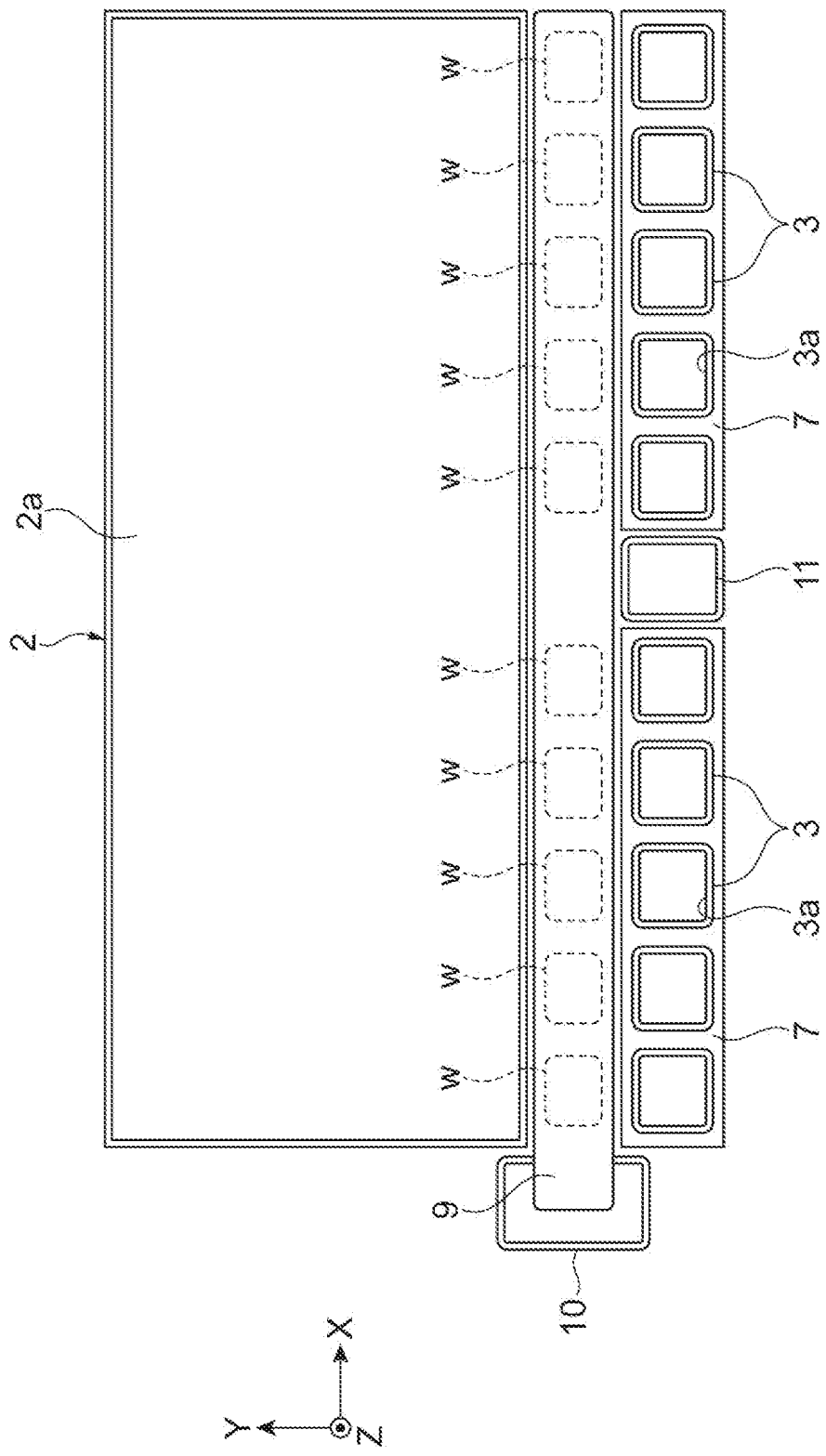
FIG. 3 is a plan view illustrating the combinatorial weighing device in FIG. 1.

As illustrated in any of FIGS. 1 to 3, a combinatorial weighing device 1 weighs articles (articles having uneven unit masses, such as agricultural products, aquatic products, and processed foods) supplied from the outside to achieve a target mass value and supplies the articles to a device such as a bag forming/packaging machine of a following stage, for example. The combinatorial weighing device 1 includes a retention unit 2, a plurality of pool hoppers 3, a plurality of weighing hoppers 4, a weighing unit 5, a robot hand 6, supplying conveyors 7, a control unit 8, a collection conveyor 9, and a collection box 10. In the following description, description will be given while a vertical direction is referred to as a Z direction, a horizontal direction corresponding to a forward-rearward direction of the combinatorial weighing device 1 is referred to as a Y direction, and a horizontal direction perpendicular to the Y direction and the Z direction is referred to as an X direction.

The retention unit 2 is a part for retaining articles (insertion targets) to be inserted into the pool hoppers 3. The retention unit 2 exhibits a rectangular box shape opening upward while having the X direction as its longitudinal direction. The retention unit 2 has a flat placement surface 2a. In the retention unit 2, an article supplied from the outside is placed on the placement surface 2a and is retained therein.

The pool hopper 3 is a container into which an article is inserted by the robot hand 6. The pool hopper 3 exhibits a cup shape opening upward. The pool hoppers 3 are supported directly or indirectly by a frame F. The pool hoppers 3 are arranged side by side in the X direction at positions below the retention unit 2 and away from the retention unit 2 in the Y direction. An upper edge of the pool hopper 3 constitutes an article insertion port 3a through which an article is inserted. The article insertion port 3a has a rectangular shape when viewed from above (refer to FIG. 3). A gate 3b which can be opened and closed is provided in a bottom portion of the pool hopper 3. The pool hopper 3 receives an inserted article and temporarily retains the article by closing the gate 3b. The pool hopper 3 discharges a temporarily retained article downward by opening the gate 3b. Opening/closing operation of the pool hopper 3 is controlled by the control unit 8.

The weighing hopper 4 is a container into which an article is inserted from the pool hopper 3. Similar to the pool hopper 3, the weighing hopper 4 exhibits a cup shape opening upward. The weighing hoppers 4 are supported directly or indirectly by the frame F. The weighing hoppers 4 are arranged side by side in the X direction below the plurality of pool hoppers 3. The weighing hoppers 4 are disposed immediately below the respective gates 3b of the plurality of pool hoppers 3. An upper edge of the weighing hopper 4 constitutes an article insertion port 4a through which an article is inserted. The article insertion port 4a has a rectangular shape when viewed from above. A gate 4b which can be opened and closed is provided in a bottom portion of the weighing hopper 4. The weighing hopper 4 receives an article discharged from the pool hopper 3 immediately thereabove and temporarily retains the article by closing the gate 4b. The weighing hopper 4 discharges a temporarily retained article downward by opening the gate 4b. Opening/closing operation of the weighing hopper 4 is controlled by the control unit 8. The expression "immediately below" denotes a place immediately below in the vertical direction, and the expression "immediately above" denotes a place immediately above in the vertical direction.

The weighing unit 5 weighs each of a plurality of articles retained in the plurality of pool hoppers 3. Here, the weighing unit 5 weighs an article retained in the pool hopper 3 in the weighing hopper 4 immediately below the pool hopper 3. That is, the weighing unit 5 acquires a weighing value of an article retained in the pool hopper 3 immediately above the weighing hopper 4 by weighing the article temporarily retained inside the weighing hopper 4. The weighing unit 5 is disposed inside the frame F. The weighing unit 5 has load cells 5a. A plurality of load cells 5a corresponding to the number of weighing hoppers 4 are provided. The load cells 5a support the corresponding weighing hoppers 4. When an article is temporarily retained in the weighing hopper 4, the load cell 5a outputs a weighing value corresponding to the mass of the article to the control unit 8.

The robot hand 6 inserts an article retained in the retention unit 2 into the pool hopper 3. The robot hand 6 is a mechanical hand realizing work of grasping, releasing, carrying, and the like. The robot hand 6 is also referred to as a robotic arm or articulating robotic arm that can be configured with multiple degrees of freedom of movement. The robot hand 6 is basically a portion (tip portion of a manipulator) of a larger robot apparatus (not shown). The robot hand 6 has a holding portion 6a for holding an article retained in the retention unit 2. Here, the holding portion 6a is a gripping portion for gripping an article that also has at least one degree of freedom of movement relative to the remainder of the robot hand 6. Operation of the robot hand 6 is controlled by the control unit 8. The kind, the specification, the function, the size, and the like of the robot hand 6 are not particularly limited. Various known or conventional robot hands and robot apparatus can be used as the robot hand 6. Therefore, further description of the robot hand 6 and the holding portion 6a (also referred to as a gripping portion 6a) is omitted for the sake of brevity.

The supplying conveyors 7 extend in the X direction below the plurality of weighing hoppers 4. The supplying conveyors 7 are disposed separately on one side and the other side in the X direction. The supplying conveyors 7 receive articles discharged from the weighing hoppers 4 and convey the articles toward a chute 11. Conveyance operation of the supplying conveyors 7 is controlled by the control unit 8. The chute 11 is disposed between one side and the other side of the supplying conveyors 7. For example, the chute 11 is a rectangular tube body tapered downward. The chute 11 receives articles conveyed by the supplying conveyors 7 and discharges the articles downward. For example, articles discharged from the chute 11 are supplied to a device of a following stage.

The control unit 8 is a computation device having a central processing unit (CPU), a read only memory (ROM), a random access memory (RAM), and the like. For example, the control unit 8 is disposed inside the frame F. The control unit 8 controls operation of each unit in the combinatorial weighing device 1.

The control unit 8 executes next combinatorial weighing processing. That is, the control unit 8 stores weighing values which are weighed by the weighing unit 5 and are associated with the weighing hoppers 4 retaining articles corresponding to the weighing values. A combination of weighing values is selected from a plurality of weighing values weighed by the weighing unit 5 and associated with the respective weighing hoppers 4 such that a total value becomes a target mass value. More specifically, a combination of weighing values is selected from a plurality of weighing values output by the weighing unit 5 such that the total value settles within a predetermined range having the target mass value as a lower limit value. An open signal is output to the weighing hopper 4 related to the combination, the gate 4b thereof is set to an open state, and an article related to the combination is discharged to the supplying conveyors 7.

The control unit 8 outputs a close signal to the weighing hopper 4 which has completed discharging of an article, and the gate 4b thereof is set to a closed state. Thereafter, when it can be recognized that an article is retained in the pool hopper 3 immediately above the weighing hopper 4, the control unit 8 outputs an open signal to the pool hopper 3, sets the gate 3b thereof to an open state, and causes the article to be discharged from the pool hopper 3 to the weighing hopper 4. Recognizing an article retained in the pool hopper 3 (that is, distinguishing whether the pool hopper 3 is empty or not) can be realized by a known technique and a known configuration. For example, an article inside the pool hopper 3 can be recognized on the basis of a detection result of a sensor such as a camera, an output history of an open signal or a close signal of the gate 3b, an operation history of the robot hand 6, or the like.

The control unit 8 controls operation of the robot hand 6. Specifically, the control unit 8 controls a holding operation of the holding portion 6a of the robot hand 6 and a movement operation of the holding portion 6a. The control unit 8 executes holding control in which an article retained in the retention unit 2 is held by the holding portion 6a. For example, in holding control, an article retained in the retention unit 2 is detected by a camera, an infrared sensor, or the like mounted in the robot hand 6, and a position where the holding portion 6a starts holding an article (which will hereinafter be referred to as "a holding start position") is obtained on the basis of a detection result thereof. Further, the holding portion 6a is moved to the obtained holding start position, and the holding portion 6a is caused to hold the article.

Figure 4:
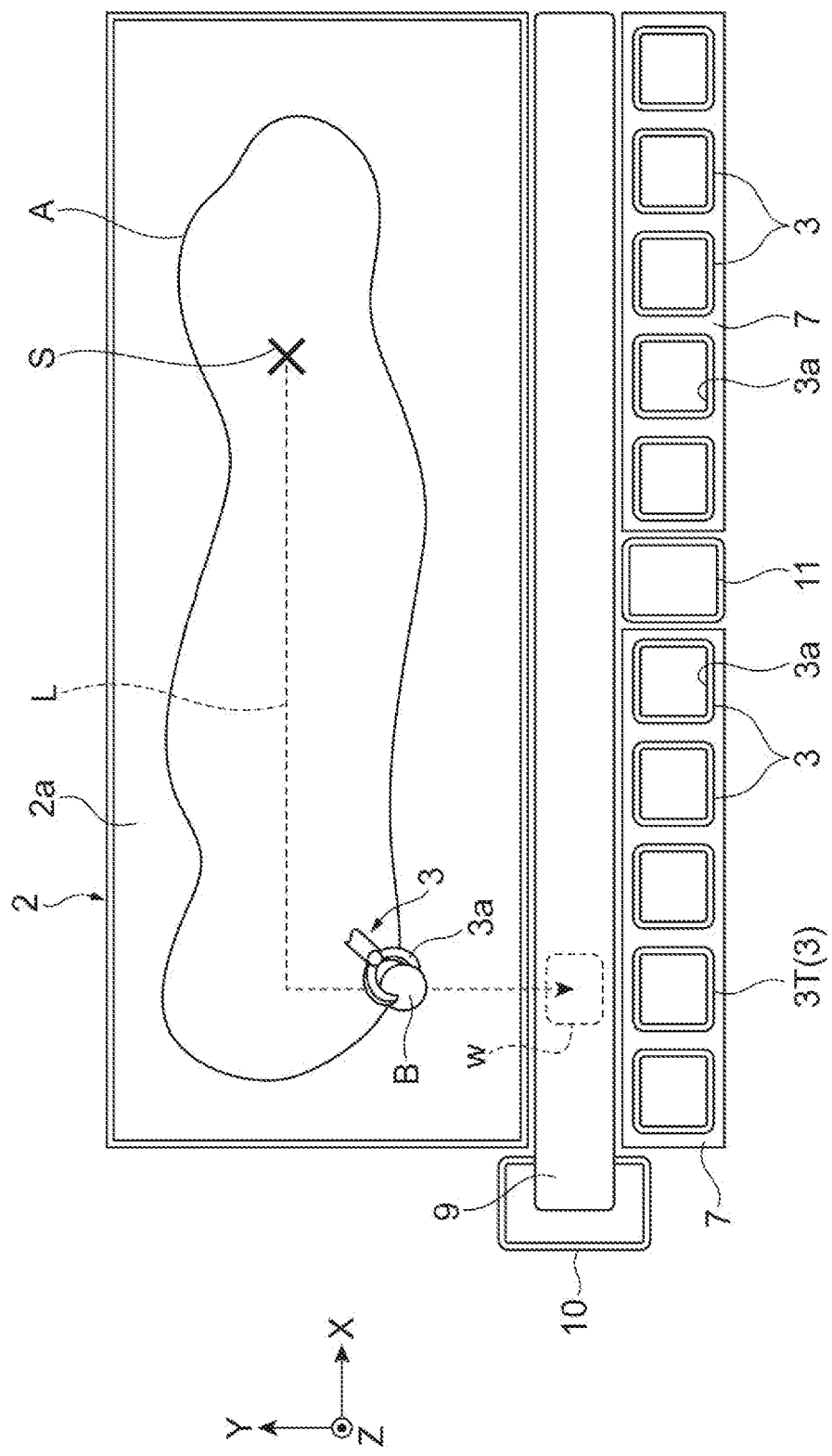
FIG. 4 is a plan view for describing stand-by insertion control of the combinatorial weighing device in FIG. 1.

As illustrated in FIGS. 3 and 4, the control unit 8 causes the holding portion 6a to hold an article B through holding control and then (in the present embodiment, immediately after) determines whether or not the article B can be inserted into a pool hopper 3T (insertion target). For example, when no retained article B is recognized in the pool hopper 3T (when it is empty), the control unit 8 determines that the article B can be inserted, and when the article B is recognized therein, the control unit 8 determines that the article B cannot be inserted. Recognizing the article B retained in the pool hopper 3T can be realized by a known technique and a known configuration as described above.

The control unit 8 executes stand-by insertion control when it is determined that the article B cannot be inserted into the pool hopper 3T serving as an insertion target. On the other hand, the control unit 8 executes direct insertion control when it is determined that the article B can be inserted into the pool hopper 3T serving as an insertion target.

In stand-by insertion control, after the holding portion 6a is temporarily disposed at a stand-by position W in a state in which the article B is held by the holding portion 6a through holding control, the article B is inserted into the pool hopper 3 via the article insertion port 3a. Disposing the holding portion 6a at the stand-by position W includes positioning a part (a central part or the like) of the holding portion 6a at the stand-by position W and positioning a holding position of the holding portion 6a at the stand-by position W.

The stand-by position W is set at a position different from a position immediately above the article insertion port 3a in the pool hopper 3T serving as an insertion target. A position different from the position immediately above the article insertion port 3a is a position which is shifted from the article insertion port 3a and does not overlap the article insertion port 3a when viewed from above. The stand-by position W is set on a movement path from a holding start position S to the position immediately above the article insertion port 3a. The movement path is a path where the holding portion 6a passes when the holding portion 6a holding the article B is moved from the holding start position S to the position immediately above the article insertion port 3a. The movement path includes a movement trajectory, which will be described below. The stand-by position W is set at a position closer to the article insertion port 3a than the holding start position S. A position closer to the article insertion port 3a than the holding start position S is a position of the holding portion 6a when the holding portion 6a holding the article B at the holding start position S approaches the article insertion port 3a.

The stand-by position W is set in a region adjacent to the article insertion port 3a of the pool hopper 3T serving as an insertion target in the Y direction when viewed from above. Here, stand-by positions W adjacent to each other in the Y direction are set for the respective article insertion ports 3a of the plurality of pool hoppers 3. The stand-by position W is set at a height position higher than the article insertion port 3a of the pool hopper 3. The stand-by position W is set to a place other than above the retention unit 2 when viewed from above. The stand-by position W is set between the retention unit 2 and the article insertion port 3a. The movement path and the stand-by position W may be set in advance and stored in the control unit 8 or may be set through computation based on a positional relationship between the holding start position S and the pool hopper 3T serving as an insertion target every time stand-by insertion control is executed.

For example, in stand-by insertion control, the holding portion 6a holding the article B is moved from the holding start position S to the stand-by position W. At this time, the holding portion 6a is moved along a trajectory L above the retention unit which is a movement trajectory passing above the retention unit 2 if possible. For example, the trajectory L above the retention unit is a movement trajectory in which the holding portion 6a moves upward from the holding start position S to a position (height position) of the stand-by position W in the Z direction, moves from the holding start position S in the X direction to a position of the pool hopper 3T in the X direction, and then moves to the stand-by position W in the Y direction. Subsequently, the holding portion 6a is stopped at the stand-by position W for a certain time. A certain time may be a time set in advance or a time taken until the pool hopper 3T becomes empty. Subsequently, the holding portion 6a is moved to a place immediately above the article insertion port 3a of the pool hopper 3T and is stopped thereat. Further, the article B held by the holding portion 6a is released, and the article B is caused to freely fall and is inserted into the pool hopper 3T via the article insertion port 3a. In FIG. 4, a range in which article B is present is indicated by the reference sign A.

In direct insertion control, the holding portion 6a is instantly moved to the position immediately above the article insertion port 3a without causing the holding portion 6a to be temporarily disposed at the stand-by position W, and the article B is inserted into the pool hopper 3T via the article insertion port 3a. For example, in direct insertion control, the holding portion 6a holding the article B is moved along the trajectory L above the retention unit to a place immediately above the pool hopper 3T serving as an insertion target as it stands without stopping at the stand-by position W and then is stopped thereat. Further, the article B held by the holding portion 6a is released, and the article B is caused to freely fall and is inserted into the pool hopper 3T via the article insertion port 3a.

As illustrated in FIGS. 1 and 2, the collection conveyor 9 is disposed below the stand-by position W. The collection conveyor 9 extends in the X direction between the retention unit 2 and the article insertion port 3a such that a plurality of stand-by positions W are included when viewed from above. The collection conveyor 9 receives some or all of the articles B which have fallen from the holding portion 6a during stand-by at the stand-by position W and conveys the received articles B in the X direction. The collection conveyor 9 constitutes a collection portion.

The collection box 10 is disposed to be adjacent to a downstream side of the collection conveyor 9 in a conveyance direction. The collection box 10 receives and stores the article B which has been conveyed by the collection conveyor 9 and is discharged from a downstream end of the collection conveyor 9. Hereinabove, in the present embodiment, the retention unit 2, the robot hand 6, the control unit 8, the collection conveyor 9, and the collection box constitute an article supplying apparatus 20.

Next, an example of control executed by the control unit 8 when the article B is inserted using the robot hand 6 will be described using FIGS. 5 and 6.

For example, when the gate 4b of the weighing hopper 4 is opened, holding control is executed upon the fact (an output of an open signal from the control unit 8 to the weighing hopper 4) as a trigger, and the article B retained in the retention unit 2 is held by the holding portion 6a at the holding start position S. In parallel with this, the pool hopper 3 immediately above the weighing hopper 4 having the opened gate 4b is set as the pool hopper 3T serving as an insertion target.

Immediately after holding control is executed, it is determined whether or not the article B can be inserted into the pool hopper 3T. As illustrated in FIG. 5(a), when the article B is already retained in the pool hopper 3T, it is determined that an article cannot be inserted into the pool hopper 3T, and stand-by insertion control is executed. In stand-by insertion control, as illustrated in FIG. 5(b), the holding portion 6a holding the article B is temporarily disposed at the stand-by position W before being disposed at a position immediately above the article insertion port a. Accordingly, the article B held by the holding portion 6a is temporarily disposed at the stand-by position W. As illustrated in FIG. 5(c), while the holding portion 6a is disposed at the stand-by position W, the article B is discharged from the pool hopper 3T to the weighing hopper 4. Thereafter, as illustrated in FIG. 5(d), the holding portion 6a is moved to a place immediately above the article insertion port 3a of the pool hopper 3T, the article B held by the holding portion 6a is released, and the article B is inserted into the pool hopper 3T.

Figure 6B:
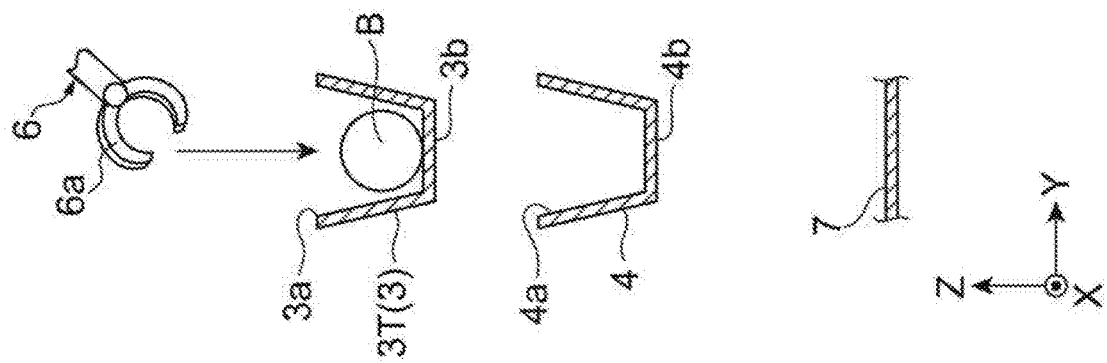
FIG. 6(b) is a view illustrating a continuation of FIG. 6(a).
Figure 6A:
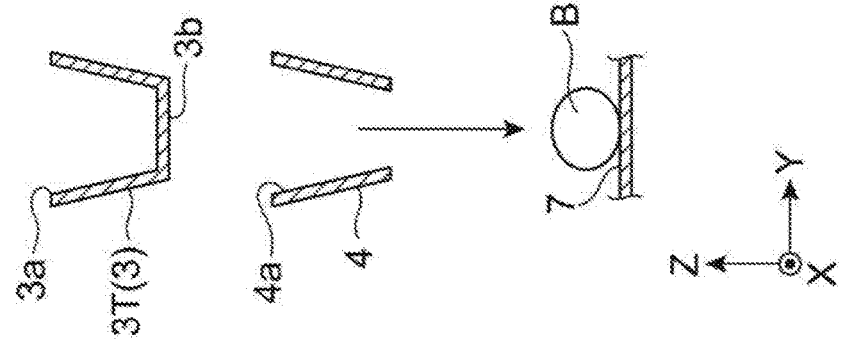
FIG. 6(a) is a view for describing direct insertion control of the combinatorial weighing device in FIG. 1.

On the other hand, as illustrated in FIG. 6(a), when the pool hopper 3T is empty, it is determined that an article can be inserted into the pool hopper 3T, and direct insertion control is executed. In direct insertion control, as illustrated in FIG. 6(b), the holding portion 6a holding the article B is instantly moved to the position immediately above the article insertion port 3a, the article B held by the holding portion 6a is released, and the article B is inserted into the pool hopper 3T.

Hereinabove, in the combinatorial weighing device 1 and the article supplying apparatus 20 according to the present embodiment, during article insertion in which the article B is inserted into the pool hopper 3 by the robot hand 6, the holding portion 6a is temporarily disposed at the stand-by position W in a state in which the article B is held by the holding portion 6a of the robot hand 6. Thereafter, the holding portion 6a is moved to the position immediately above the article insertion port 3a, and the article B is inserted into the pool hopper 3 from the article insertion port 3a.

Here, for example, depending on the kind or the like of the article B to be handled, even though the article B is held by the holding portion 6a, there is a possibility that the article B may slip out of the holding portion 6a with the lapse of time. In this regard, since the stand-by position W is different from the position immediately thereabove, even if some articles B slip out of the holding portion 6a, erroneous insertion of some of the articles B which have slipped out into the pool hopper 3 can be curbed. In addition, even if the article B is a long article, contact of the article B with the pool hopper 3 at an unintended timing can be curbed. Moreover, the stand-by position W is a position set on the movement path from the holding start position S to the position immediately above the article insertion port 3a. Thus, for example, compared to when the holding portion 6a stands by at a position away from the movement path, a time lag (delay) caused by operation of the robot hand 6 can be curbed, for example, and efficient article insertion can be maintained.

Therefore, in the combinatorial weighing device 1 and the article supplying apparatus 20 utilizing the robot hand 6, efficient article insertion can be maintained and the article insertion can be appropriately performed. As a result, when the article B is weighed by the weighing unit 5, weighing abnormality and erroneous weighing caused by drop or the like from the holding portion 6a can be prevented.

In the combinatorial weighing device 1 and the article supplying apparatus 20, after the article B is held through holding control, it is determined whether or not the article B can be inserted into the pool hopper 3T serving as an insertion target. Stand-by insertion control is executed when it is determined that the article B cannot be inserted, and direct insertion control is executed when it is determined that the article B can be inserted. In this configuration, during article insertion performed by the robot hand 6, the holding portion 6a is not temporarily disposed at the stand-by position W at all times, but an article is inserted into the pool hopper 3T as it stands without causing the holding portion to be temporarily disposed at the stand-by position W when the article B can be inserted. Thus, unnecessary stand-by of the holding portion 6a can be curbed, and efficient article insertion can be realized.

In the combinatorial weighing device 1 and the article supplying apparatus 20, the stand-by position W is a position closer to the article insertion port 3a than the holding start position S. Thus, for example, compared to when the holding portion 6a stands by at the holding start position S or a position away from the article insertion port 3a than the holding start position S, the time lag described above can be curbed, and efficient article insertion can be maintained.

In the combinatorial weighing device 1 and the article supplying apparatus 20, the stand-by position W is set in a region adjacent to the article insertion port 3a when viewed from above. In this configuration, the time lag described above can be further curbed, and efficient article insertion can be realized.

In the combinatorial weighing device 1 and the article supplying apparatus 20, the collection conveyor 9 receiving the article B which has fallen from the holding portion 6a is disposed below the stand-by position W. In this configuration, the article B which has slipped out of the holding portion 6a during stand-by at the stand-by position W can be collected by the collection conveyor 9. The article B which has been collected by the collection conveyor 9 and stored in the collection box 10 can be returned to the retention unit 2 through automatic or manual work. For example, when the collected article B is automatically returned to the retention unit 2, a circulation conveyor conveying the article B from the collection box 10 to the retention unit 2 may be provided.

In the combinatorial weighing device 1 and the article supplying apparatus 20, the stand-by position W may be set at a height position higher than the article insertion port 3a and between the retention unit 2 and the article insertion port 3a when viewed from above. In this configuration, the time lag described above can be further curbed, and efficient article insertion can be realized.

Hereinabove, an embodiment has been described. However, the present invention is not limited to the foregoing embodiment.

In the foregoing embodiment, an example in which holding control is started upon opening of the gate 4b of the weighing hopper 4 as a trigger and the article B is inserted while having the pool hopper 3 immediately above the weighing hopper 4 as an insertion target has been described, but the embodiment is not limited thereto. For example, holding control may be started (that is, article insertion may be executed successively) upon completion of stand-by insertion control or direct insertion control as a trigger. Alternatively, holding control may be started upon the elapse of certain time after completion of stand-by insertion control or direct insertion control as a trigger. In addition, for example, the article B may be inserted while having any arbitrary one of a plurality of pool hoppers 3 as an insertion target. Alternatively, a pool hopper 3 closer to the holding start position S may be taken as an insertion target. Alternatively, any one which has been randomly selected from the plurality of pool hoppers 3 may be taken as an insertion target. Alternatively, when an empty pool hopper 3 is present, the empty pool hopper 3 may be preferentially taken as an insertion target.

The foregoing embodiment may further include a sensor for detecting that the article B held by the holding portion 6a is away from the placement surface 2a of the retention unit 2 (does not come into contact with the placement surface 2a). This configuration is particularly effective in confirming that the article B is isolated from the placement surface 2a when the article B is a long article, for example.

In the foregoing embodiment, the number of robot hands 6 is not limited, and a plurality of robot hands 6 may be provided. In the foregoing embodiment, the article B is inserted into the pool hopper 3 by the robot hand 6. However, for example, when the combinatorial weighing device 1 has no pool hoppers 3, the article B may be inserted into the weighing hopper 4 by the robot hand 6. In the foregoing embodiment, the holding portion 6a is moved along the trajectory L above the retention unit, but a trajectory along which the holding portion 6a is moved is not particularly limited. As long as the holding portion 6a can be moved to the stand-by position W or the position immediately above the article insertion port 3a, the holding portion 6a may be moved along every possible trajectory.

In the foregoing embodiment, a weighing function may be mounted in the robot hand 6. That is, in place of or in addition to the weighing unit 5, a weighing unit weighing the article B being held by the holding portion 6a of the robot hand 6 may be included. The foregoing embodiment has a configuration in which the holding portion 6a grips the article B, but the configuration of the holding portion 6a is not particularly limited. The holding portion 6a may have a configuration in which the article B is scooped in place of or in addition to a configuration of gripping the article B, may have a configuration of adsorbing the article B, may have a configuration of supporting the article B from below, or may have a configuration in which these are combined.

In the foregoing embodiment, the stand-by position W is not particularly limited and need only be different from the position immediately above the article insertion port 3a and set at a position closer to the article insertion port 3a than the holding start position S. In the foregoing embodiment, the same number of stand-by positions W as the number of pool hoppers 3 is set, but one stand-by position W may be set for a plurality of pool hoppers 3 or a plurality of stand-by positions W may be set for one pool hopper 3.

In the foregoing embodiment, the retention unit 2 is not limited to an element having the placement surface 2a and may have an arbitrary shape. For example, the retention unit 2 may have a configuration in which an article is deposited inside an accommodation container. In the foregoing embodiment, the placement surface 2a of the retention unit 2 may be inclined with respect to a horizontal surface such that no article B remains in the retention unit 2. In the foregoing embodiment, the retention unit 2 may be oscillated such that no article B remains in the retention unit 2.

In the foregoing embodiment, the collection conveyor 9 is disposed below the stand-by position W to serve as a collection portion, but a collection portion is not limited to the collection conveyor 9. For example, when the stand-by position W is set above the retention unit 2, the article B which has fallen from the holding portion 6a can be received by the retention unit 2. Therefore, in this case, the retention unit 2 constitutes a collection portion.

In the foregoing embodiment, it is determined whether or not the article B can be inserted into the pool hopper 3T serving as an insertion target immediately after the article B is held by the holding portion 6a, but the determination is not limited to being executed immediately after the article B is held and need only be executed after the article B is held. For example, in the article supplying apparatus 20 including a plurality of robot hands 6, when the article B is held by a certain robot hand 6, determining whether or not the article B can be inserted into the pool hopper 3T may be executed at an arbitrary timing while another robot hand 6 is holding, moving, or inserting the article B.

In the foregoing embodiment, the article supplying apparatus 20 is applied to the combinatorial weighing device 1 but may be applied to various other combinatorial weighing devices or may also be applied to devices other than combinatorial weighing devices. The foregoing embodiment can also be regarded as an embodiment for an article supplying method or a combinatorial weighing method.

The invention claimed is:

1. An article supplying apparatus comprising:
a retention unit configured to retain an article serving as an insertion target;
a robot hand configured to insert the article retained in the retention unit into a container; and
a control unit configured to control operation of the robot hand,
wherein the robot hand has a holding portion for holding the article, and
wherein the control unit executes
holding control in which the holding portion holds the article retained in the retention unit and then begins moving the article along a movement path from the retention unit toward an article insertion port above a container, the location in which the holding portion begins holding the article in the retention unit defines a start position of the article held by the holding portion, and
stand-by insertion control in which the holding portion is temporarily stopped at a stand-by position that is different from the start position and different from a position immediately above the article insertion port of the container, and after completion of the stand-by insertion control, the article is moved to a position above the article insertion port where the article is inserted into the container via the article insertion port,
wherein the control unit:
operates the holding portion to hold the article and determines whether or not the article is able to be inserted into the container,
executes the stand-by insertion control in response to determining that the article is not to be inserted into the container, and
executes direct insertion control in which the holding portion is instantly moved to the position immediately above the article insertion port without being temporarily disposed at the stand-by position and the article is inserted into the container via the article insertion port when in response to the control unit determining that the article is to be inserted into the container.

2. The article supplying apparatus according to claim 1, wherein the stand-by position is set at a position closer to the article insertion port than the start position of the holding through the holding control.

3. The article supplying apparatus according to 2, wherein the stand-by position is set in a region adjacent to the article insertion port when viewed from above.

4. The article supplying apparatus according to claim 2, wherein a collection portion receiving the article which has fallen from the holding portion is disposed below the stand-by position.

5. The article supplying apparatus according to claim 2, wherein the stand-by position is set at a height position higher than the article insertion port and between the retention unit and the article insertion port when viewed from above.

6. The article supplying apparatus according to claim 1, wherein the stand-by position is set in a region adjacent to the article insertion port when viewed from above.

7. The article supplying apparatus according to claim 6, wherein a collection portion receiving the article which has fallen from the holding portion is disposed below the stand-by position.

8. The article supplying apparatus according to claim 6, wherein the stand-by position is set at a height position higher than the article insertion port and between the retention unit and the article insertion port when viewed from above.

9. The article supplying apparatus according claim 1, wherein a collection portion receiving the article which has fallen from the holding portion is disposed below the stand-by position.

10. The article supplying apparatus according to claim 9, wherein the stand-by position is set at a height position higher than the article insertion port and between the retention unit and the article insertion port when viewed from above.

11. The article supplying apparatus according to claim 1, wherein the stand-by position is set at a height position higher than the article insertion port and between the retention unit and the article insertion port when viewed from above.

12. A combinatorial weighing device comprising:
a retention unit configured to retain an article serving as an insertion target;
a plurality of hoppers configured to allow the article to be inserted thereinto and to temporarily retain the article;
a weighing unit configured to weigh each of a plurality of the articles retained in the plurality of hoppers;
a robot hand configured to insert the article retained in the retention unit into the hopper; and
a control unit configured to control operation of the robot hand, to select a plurality of the articles, of which a sum of weighing values becomes a target mass value set in advance, from the plurality of the articles weighed by the weighing unit, and to discharge the plurality of the selected articles from the hoppers,
wherein the robot hand has a holding portion for holding the article, and
wherein the control unit executes
holding control in which the holding portion holds the article retained in the retention unit and then begins moving the article along a movement path from the retention unit toward an article insertion port above a container, the location in which the holding portion begins holding the article in the retention unit defines a start position of the article held by the holding portion, and
stand-by insertion control in which the holding portion is temporarily stopped at a stand-by position that is different from the start position and different from a position immediately above the article insertion port of the hopper, and after completion of the stand-by insertion control, the article is moved to a position closer to the article insertion port than the start position and then the article is inserted into the hopper via the article insertion port,
wherein the control unit:
operates the holding portion to hold the article and determines whether or not the article is able to be inserted into the container,
executes the stand-by insertion control in response to determining that the article is not to be inserted into the container, and
executes direct insertion control in which the holding portion is instantly moved to the position immediately above the article insertion port without being temporarily disposed at the stand-by position and the article is inserted into the container via the article insertion port when in response to the control unit determining that the article is to be inserted into the container.

* * * * *